United States Patent
Weinberg

[11] Patent Number: 5,589,834
[45] Date of Patent: Dec. 31, 1996

[54] COST EFFECTIVE GEOSYNCHRONOUS MOBILE SATELLITE COMMUNICATION SYSTEM

[75] Inventor: Aaron Weinberg, Potomac, Md.

[73] Assignee: Stanford Telecommunications, Inc., Reston, Va.

[21] Appl. No.: 231,711

[22] Filed: Apr. 22, 1994

[51] Int. Cl.⁶ .................................... H04B 7/185
[52] U.S. Cl. .................................... 342/354
[58] Field of Search ................... 342/353, 354, 342/356; 455/12.1, 13.1, 13.3

[56] References Cited

U.S. PATENT DOCUMENTS

| | | |
|---|---|---|
| 4,163,235 | 7/1979 | Schultz . |
| 4,819,053 | 4/1989 | Halavais .................. 342/353 |
| 4,843,397 | 6/1989 | Galati et al. ............... 342/59 |
| 5,160,935 | 11/1992 | Inamiya .................. 342/357 |
| 5,175,556 | 12/1992 | Berkowitz ................ 342/354 |
| 5,408,237 | 4/1995 | Patterson et al. .......... 342/354 |
| 5,415,368 | 5/1995 | Horstein et al. . |
| 5,422,647 | 6/1995 | Hirshfield et al. ......... 342/354 |
| 5,448,621 | 9/1995 | Knudsen .................. 379/58 |

Primary Examiner—Theodore M. Blum
Attorney, Agent, or Firm—Jim Zegeer, Esq.

[57] ABSTRACT

A satellite communication system including one or more satellites in geosynchronous orbit and inclined at a predetermined angle greater than 0° relative to earth, a preferred angle being about 28.5° for full earth coverage, there is a constellation of satellites. Each satellite has a multi-element phased array antenna and transmit and receive circuits selectively connected to said multi-element phased array antenna for providing spatially discriminated spot radiation beams on the earth's surface, and a steerable spaced/ground antenna and transmitter-receiver circuitry connected thereto. At least one gateway ground terminal having means for performing all spacecraft command and control, including uplink phasing of said phased array antenna for directive satellite transmissions to desired user locations. Tracking the moving satellites via combination of range and doppler tracking, steering said space/ground antenna in accordance with satellite motion, performing all ground-beamforming associated with user inbound transmissions, performing all user signal modulation and demodulation, providing the necessary ground interfaces with the external cellular and terrestrial networks. A plurality of earth-based low power transceivers are provided for one and two-way communications via selected elements of said phased array antenna.

10 Claims, 9 Drawing Sheets

Satellites Numbered 1-5, Evenly Spaced both in their Ascending Nodes and in their True Anomalies Satellites Numbered 1-6, and their Locations @ Time=0 are Indicated by Circles

COST EFFECTIVE GEOSYNCHRONOUS MOBILE SATELLITE COMMUNICATION SYSTEM

BACKGROUND OF THE INVENTION

Enormous activity has taken place, and resources expended in recent years towards defining a broad range of future satellite communication (satcom) system architectures that are striving to provide global services. These services accommodate both stationary and mobile users, and range in sophistication from one-way paging and messaging to two-way high-quality voice. During recent years, activities have also included many filings with the FCC in order to receive approval to proceed with development, launch, and operations by the mid-to-late 1990's. the concepts proposed have been quite diverse and encompass:

1. Low Earth Orbits (LEO)—e.g., Motorola's Iridium, Loral's Globalstar, and Orbital Sciences Orbcomm—which propose operational constellations with satellite quantities ranging from 26 to 66.

2. Medium Earth Orbits—e.g., TRW's Odyssey—which propose operational constellations with satellite quantities on the order of 12.

3. Geosynchronous Orbits (GEO)—e.g, American Mobile Satellite in geostationary orbit—which either provide regional coverage, or would require on the order of 4 to 5 satellites for global coverage at latitudes up to 70°.

Many tradeoffs have been addressed in the literature describing these systems. Examples include:
Benefits of decreasing orbital altitude:
 1. Per satellite launch cost decreases.
 2. User and satellite transmit power and/or antenna complexity decrease.
 3. Propagation delay decreases.
Benefits of increasing orbital altitude:
 1. Quantity of operational satellites and supporting ground stations decrease.
 2. Satellite handover complexity decreases, and is eliminated in the GEO architecture.
 3. For the GEO architecture, full operational capability can evolve—one geographic region at a time—per launch.
 4. Satellite life increases for altitudes above the Van Allen Belts.
Other considerations:
 1. A non-stationary satellite system is more amenable to providing attractive user-to-satellite elevation angles.
 2. The quantity of operational satellites is heavily driven by truly global coverage (100% of the time) vs. alternatives (e.g., only land masses or less than 100% at extreme latitudes), and the minimum acceptable user-to-satellite elevational angle.

Ultimately, the drivers for a successful commercial system must reduce to the combination of cost, service and quality benefits, and reliability. While many detailed assumptions enter into cost calculations, FIG. 1 presents the results of cost trades analysis (done by others), for a specific mobile satcom system application supporting two-way voice, that encompass satellite complexity, launch cost and satellite quantity. These results demonstrate the cost effectiveness of Odyssey MEO system. At the same time, however, these results provide the key message that GEO system cost is not much greater—even though the individual GEO satellite cost may be high—given its much smaller constellation size, fewer ground stations, simpler control, and the longer lifetime of each satellite.

The insight gained from the analysis shown in FIG. 1 are actually much more profound since they provide a much broader and exciting message concerning GEO systems:

If sufficient implementation (weight, size, power, complexity) and launch cost reduction per GEO satellite can be achieved, while simultaneously enhancing coverage and satellite/user elevation angles, then a GEO constellation potentially emerges as the lowest cost alternative for providing global, mobile satellite communications. In addition, the GEO cost benefit can be maximized by targeting a carefully selected set of mobile and non-mobile applications that are ideally suited for GEO satellites.

The object of this invention is to provide an improved satellite communication system using geosynchronous.

SUMMARY OF THE INVENTION

The GEosynchronous Mobile Satcom (GEMS) system of this invention (hereafter sometimes referred to as GEMS) an entirely new satellite constellation and satellite architecture to cost-effectively and efficiently service a large, diverse population of mobile and non-mobile users. The GEMS concept emphasizes high-capacity, low-power, random access transmissions from ground users to the satellite, with a more limited capacity for transmissions to the ground user. Representative applications include: search and rescue; automated meter reading via transmission to satellite; tracking of truck fleets, boats, tankers via periodic transmissions to satellite; two-way communications when a user is in a remote area (e.g., augments terrestrial cellular network) (see FIG. 2).

The novel satellite constellation and satellite design simultaneously combine the benefits of geosynchronous satellites and LEO/MEO satellites. Unique satellite system features claimed are:

1. Constellation of geosynchronous satellites, inclined @28.5°. While an inclination of ~0° represents the conventional approach of geosynchronous satellites, and is attractive for precise regional coverage, the higher, proposed inclination provides unique advantages, not achievable via 0° inclinations:

a. 5 to 6 satellites provide continuous global coverage, with high elevation angles (e.g., >25°–30°) over virtually all land masses with significant population densities. Such elevation angles are important for reliable satellite communications in areas containing structures, such as buildings.

b. For this same satellite constellation, elevation angles also exceed 15°–20° in most other global areas, including oceans and polar areas, with every point on earth being provided a continuous elevation angle >10°. Note that lower elevation angles are permissible in such "open" areas that do not densely contain structures.

c. The 28.5° inclination provides a minimum energy launch, from the key launch site of Cape Kennedy, thereby reducing launch cost and/or yielding increased on-orbit fuel for increased spacecraft life.

d. The GEMS satellite motion provides the ground user with a signal source for position determination purposes. This can augment GPS for increased accuracy and/or increased robustness via one or more of the following approaches: apply the GEMS as a ranging/doppler source; apply each GEMS satellite as a reference for Differential GPS (DGPS); take advantage of the ~1 GHz frequency separation between GPS and GEMS to obtain highly accurate ionospheric corrections (this may be especially valuable for high-accuracy applications, such as surveying).

2. The geosynchronous satellite constellation of this invention is a significant departure from the LEO and MEO mobile satcom concepts that are being proposed, and offers significant, unique advantages:

a. Dramatic reduction in the required number of satellites—e.g., 5 to 6, as compared to 66 for Motorola's Iridium.

b. Much simpler operations. In particular, the ground user virtually never has to hand-over from one satellite to another during a service period. In addition, the "slower" relative motion of the satellite reduces signal dynamics, thereby simplifying and speeding up the user signal acquisition process.

c. The higher, geosynchronous orbit leads to reduced drag and less radiation effects, thereby leading to increased spacecraft life and reduced replenishment requirements, and hence, reduced life cycle cost. The simple nature of the satellite design (described below) also leads to operational robustness and increased life. A spacecraft life of at least 15 years is anticipated.

d. No more than 3–4 ground stations are required to provide global/space ground connectivity for continuous TT&C.

e. The geosynchronous constellation/capability can evolve one global region at a time, without service gaps. This is in dramatic contrast to a LEO or MEO constellation.

3. The satellite design uniquely applies phased array antenna technology in a manner that has not been proposed to date for any commercial satellite system. This design effectively compensates for the higher path loss of geosynchronous satellites, without compromising on continuous global coverage. In other words, the geosynchronous satellite provides link quality comparable to a LEO or MEO. In addition, the phased array design provides a unique measure of operational and long-life robustness. Specific, unique features the user-to-satellite (inbound) link are as follows:

a. High-capacity random access communications is achievable via the combined use of Code Division Multiple Access (CDMA) and ground-based beamforming. A user transmit data rate ~4.8 kbps is achievable with <1 watt of transmit power into a near-omni (hemispherical) antenna. It is believed that each GEMS satellite incorporating the invention can accommodate more than 3000 simultaneous user transmissions.

b. The large phased array simultaneously provides earth coverage, spatial discrimination among geographically distributed users, and very high gain. The earth coverage is provided by each of the phased array antenna elements, while each of the spot beams formed on the ground provides the combination of spatial discrimination and high gain. This capability is a dramatic departure from conventional satellites, because broad coverage and high gain are mutually exclusive, unless complex/heavy/costly multi-spot-beam capability is incorporated directly onto the satellite. In the present invention, the broad beam coverage is accomplished on the satellite via a straightforward array of passive antenna elements, with the satellite operating in a "bent-pipe" mode—i.e., no on-board processing is required. The more complex spotbeam capability is implemented on the ground, thereby reducing complexity, risk and cost.

c. The ground-beamforming approach of this invention offers unique operational flexibility, evolution capability, and robustness since the satellite is passive and all processing complexity is ground-based. Specifically, the following may be accomplished on the ground totally transparent to the satellite: vary the number of beams; vary the size and shape of each beam; perform open-loop or adaptive beamforming; accommodate any on-board antenna element failures by adjustments in the ground beamforming algorithm. In addition, the ground beamforming hardware and software can evolve over time (e.g., as technology progresses), without impacting the satellite, thereby offering the potential for extended spacecraft life with evolutionary, improving capability.

d. The on-board phased array uniquely provides the satellite communication system of this invention with significant robustness, since the satellite performance gracefully degrades as antenna elements fail. In other words, the loss of one or a few elements, out of 60–80 elements, introduces only a fraction of a dB degradation in link performance. In addition, as noted above, such element failures can, at least partially, be accommodated by adjustments in the ground beamforming algorithm.

e. The space/ground link (SGL) antenna is the only moving part in the communication payload, and moves infrequently and slowly. This ensures simplified attitude control, and further reduces on-orbit fuel consumption.

f. The SGL downlink employs Ka-band, which provides an allocated bandwidth on the order of 1 GHz. This is adequate to accommodate the individual downlink transmissions, required from the 64–80 on-board elements, for ground beamforming.

4. The satellite phased array of this invention also provides unique capabilities on the satellite-to-user (outbound) link. Specific features include:

a. One or more simultaneous beams may be formed. The beamforming is accomplished via the setting of on-board phase shifters, via ground command; no satellite motion occurs. Total operational flexibility exists in the number and sizes of the formed beams. The specific beam parameters vary vs. time as a function of time of day, location of users, capacity requirements, data rate and throughput requirements, priorities (e.g., emergencies), etc.

b. The beamforming flexibility enables satellite configurations that support a broad range of data rates (e.g., from <1 kbps to ~100 kbps). At the lower data rates the potential exists for accommodating several hundred transmissions to users simultaneously). This dynamic, variable spot beam capability is, again, a capability not available on existing commercial satellites.

c. Because the satellite serves as a bent-pipe, the modulation/signal structure is not constrained, and can vary over the spacecraft life. The possibilities range from narrowband Frequency Division Multiple Access (FDMA), to wider band TDMA and CDMA.

d. As with the inbound case, above, the outbound capability can evolve over time via ground upgrades only—no satellite modifications are required. This leads to unique operational flexibility, robustness, and life-cycle-cost effectiveness not available via other commercial satellite system concepts.

DESCRIPTION OF THE DRAWINGS

The above and other objects, advantages and features of the invention will become more apparent when considered with the following specification and accompanying drawings wherein.

DETAILED DESCRIPTION OF THE INVENTION

The present invention introduces two unique system features: 1. Constellation of geosynchronous, inclined satellites
 a. Satellite motion provides global coverage and enhances user/satellite elevation angles.
 b. 28.5° inclination minimizes GEO launch energy from U.S. Cape Kennedy site.
 c. Inclined GEO satellites simplify orbital slot assignments relative to their geostationary counterparts.
 d. Inclined GEO satellites reduce eclipse impact on on-board power systems, relative to their geostationary counterparts→reduced battery capacity.
2. The two-way mobile-user/satellite link is supported by a large, passive phased array on each satellite.
 a. The phased array simultaneously provides global coverage and high gain, thereby keeping user transmitter/receiver requirements comparable to those of LEO or MEO system.
 b. No steerable antenna, other than for the space/ground link with the gateway; eases altitude control and momentum dumping, and reduces fuel consumption.
 c. Electronic steering of phased array accommodates satellite motion and diverse satellite locations. Electronic beam steering, in the case of the receiving antenna, requires that signals from a number of separate antenna elements, most commonly arranged in a planar area, be phase shifted by amounts depending on the distance of the element from the center of the array and the direction in which the beam is to form.
 d. Beamforming on the user-to-gateway link is accomplished on the ground, thereby dramatically reducing satellite power/complexity/cost and greatly increasing operational/evolutionary flexibility.
 e. Dynamic allocation/adjustment of beamforming capability is based on need (e.g., emergency) or partial failures, without impact on the attitude control system.

Figure 2:
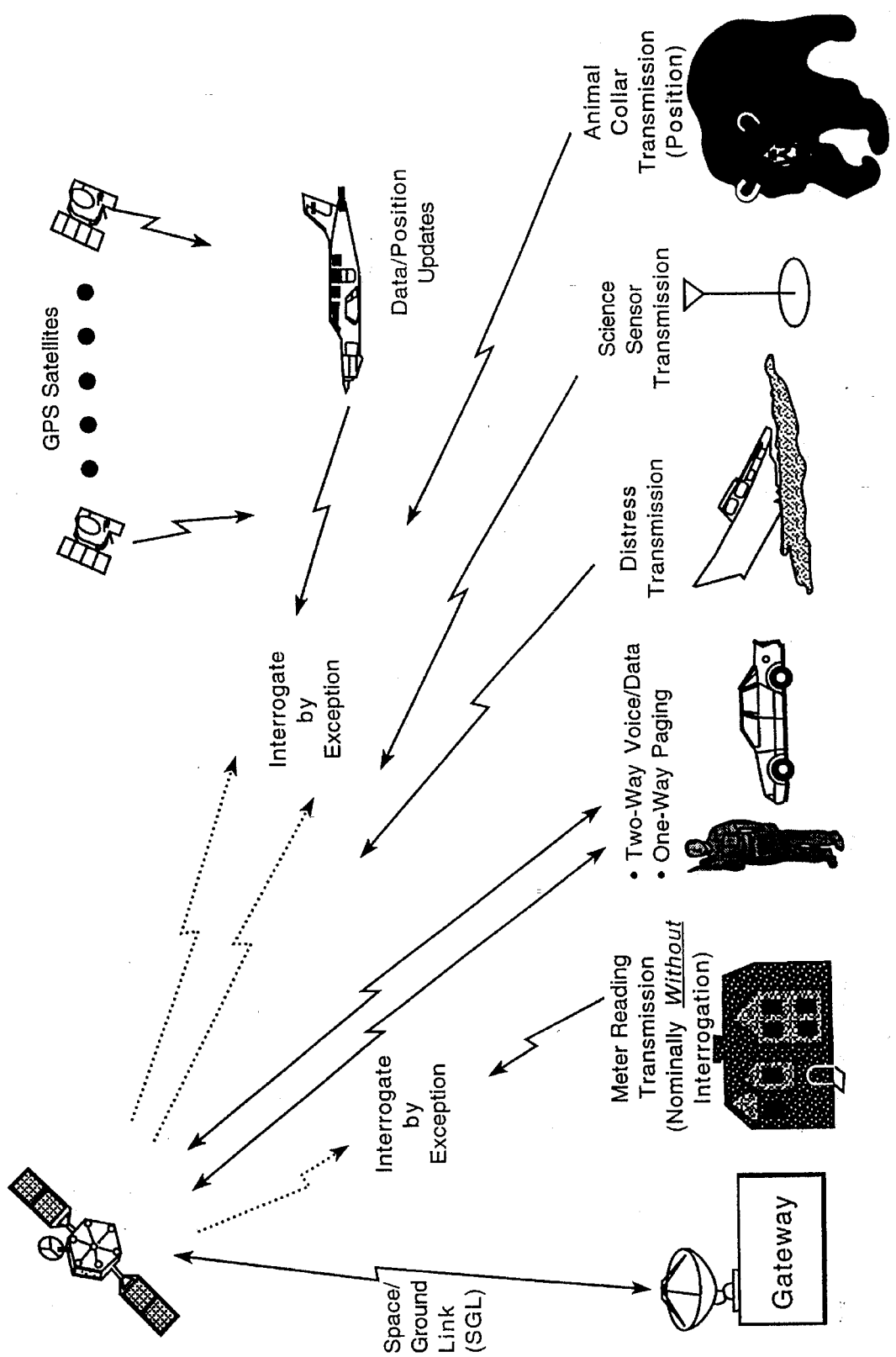
FIG. 2 illustrates the broad range of representative services that may be provided by the satellite system of this invention.

Especially significant is the tailoring of each GEO satellite's phased array to the accommodation of dynamically varying services based on coverage region, time-of-day, and need. As shown in FIG. 2, representative services include:

1. Low-rate, spread-spectrum code division multiple access (SS-CDMA) random access user transmissions (e.g., for reading of electric/gas/water meters at homes, businesses, farms, etc.). Interrogations occur only by exception, thereby minimizing satellite transmitter requirements.

2. Low-rate random access transmissions from other user types (e.g., globally distributed science sensors, emergency/search-and-rescue transmitters, animal tracking devices, etc.). Transmissions back to the user need not occur, or occur as needed, again minimizing satellite transmitter requirements.

3. Two-way data communications, which includes mix of data rates ranging up to 4.8 kbps.

4. Two-way, 4.8 kbps voice.

5. Reference for differential GPS (DGPS) geolocation—which would be capable of providing positioning accuracies to the several meter level.

These unique features, which are discussed in detail hereinafter, overcome virtually all concerns associated with GEO satellites, and in fact, lead to an operational system that is ideally suited for utilization of GEO satellites. As such, the above features lead to a global satcom system that is more cost-effective than any other MEO or LEO system proposed to date. In addition, the satellite technology implementation risk is low, given that the required subsystems have already either flown, or reflect mature technology. An example is NASA's Tracking and Data Relay Satellite System (TDRSS), whose satellites contain on-board phased array antennas.

SYSTEM ARCHITECTURE

Figure 3:
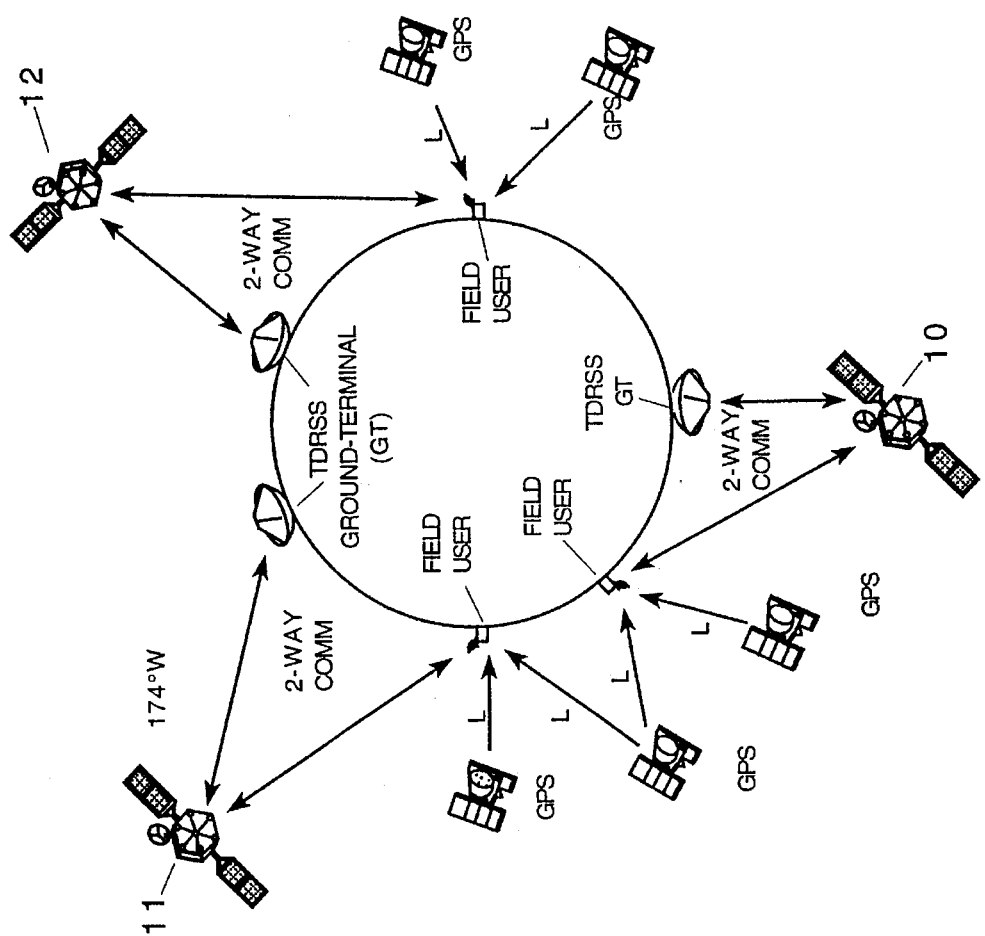
FIG. 3 illustrates the global satellite system architecture, that requires only a relatively small number of satellites and ground stations, and also optionally takes advantage of the GPS constellation for user and satellite tracking, FIG. 4 and FIG. 5 describe ground traces of the proposed geosynchronous-inclined satellite system for the two cases of 5 and 6 satellite constellations, respectively.

FIG. 3 illustrates a representative global satellite system architecture, that incorporates both the GEO satellites of interest, and assumes the availability of GPS signals to users that require periodic updates of their position. It should be emphasized at the outset that the three GEO satellites 10, 11 and 12 shown are illustrative only, with the specific required number of satellites ultimately a function of system-level requirements. In particular, the quantity and mutual phasing of satellites within the constellation may be tailored to specific drivers. These include:

1. Region-to-global coverage.

2. Minimum elevation angles vs. geographic region (e.g., latitude, rural vs. urban, or population density).

3. Primary and backup coverage over mid-latitudes.

4. "High" elevation angles in urban and high population density areas.

5. "Lower" elevation angles permissible at higher latitudes and oceanic areas.

For the purpose of this disclosure, the focus will be on the most general scenario of global coverage. Clearly, regional coverage is a special case that leads to the use of fewer satellites. The results and discussion that follow provided the frame of reference and insights that are necessary for application to arbitrary scenarios of interest.

SATELLITE CONSTELLATION DESCRIPTION AND KEY FEATURES

Figure 4:
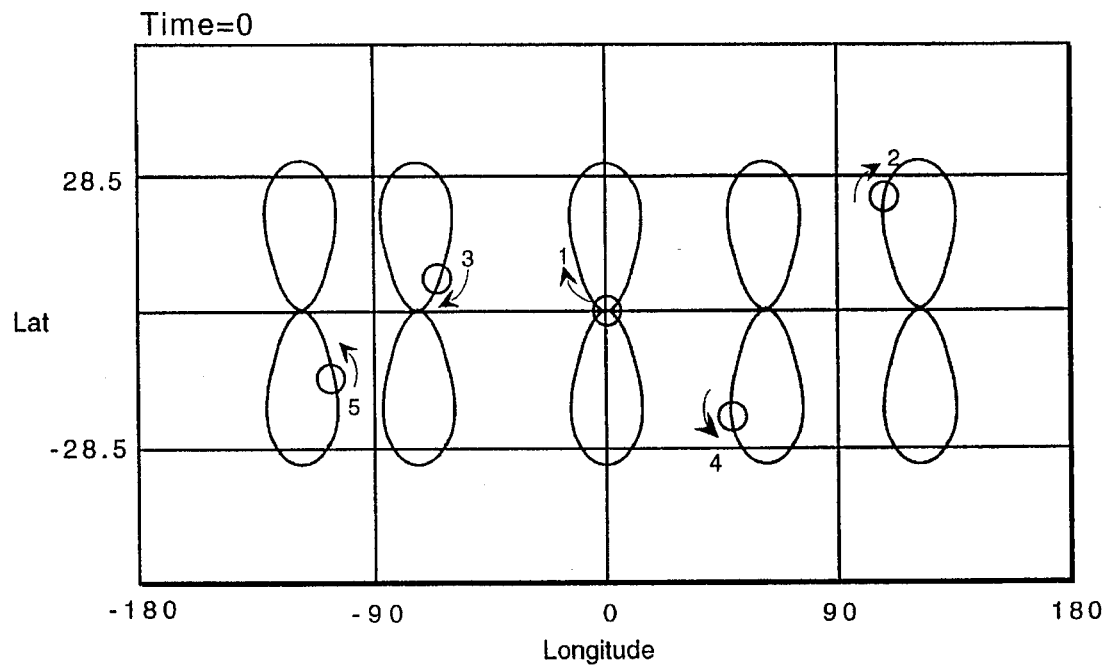
Figure 5:
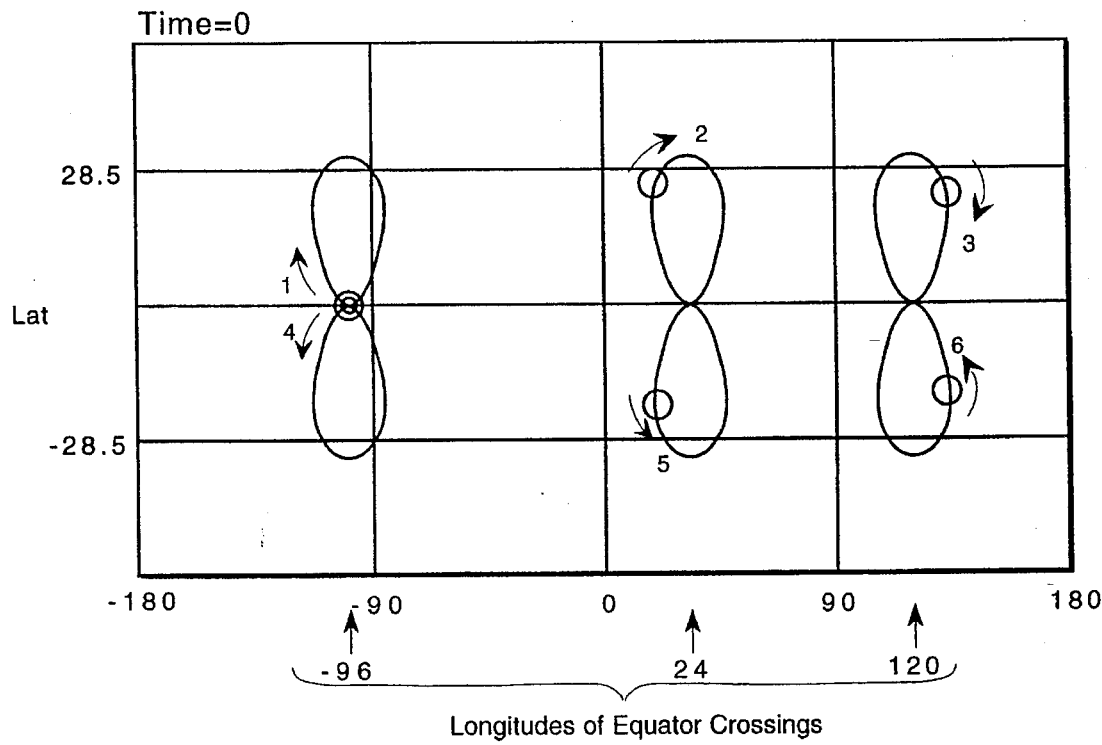
Figure 6:
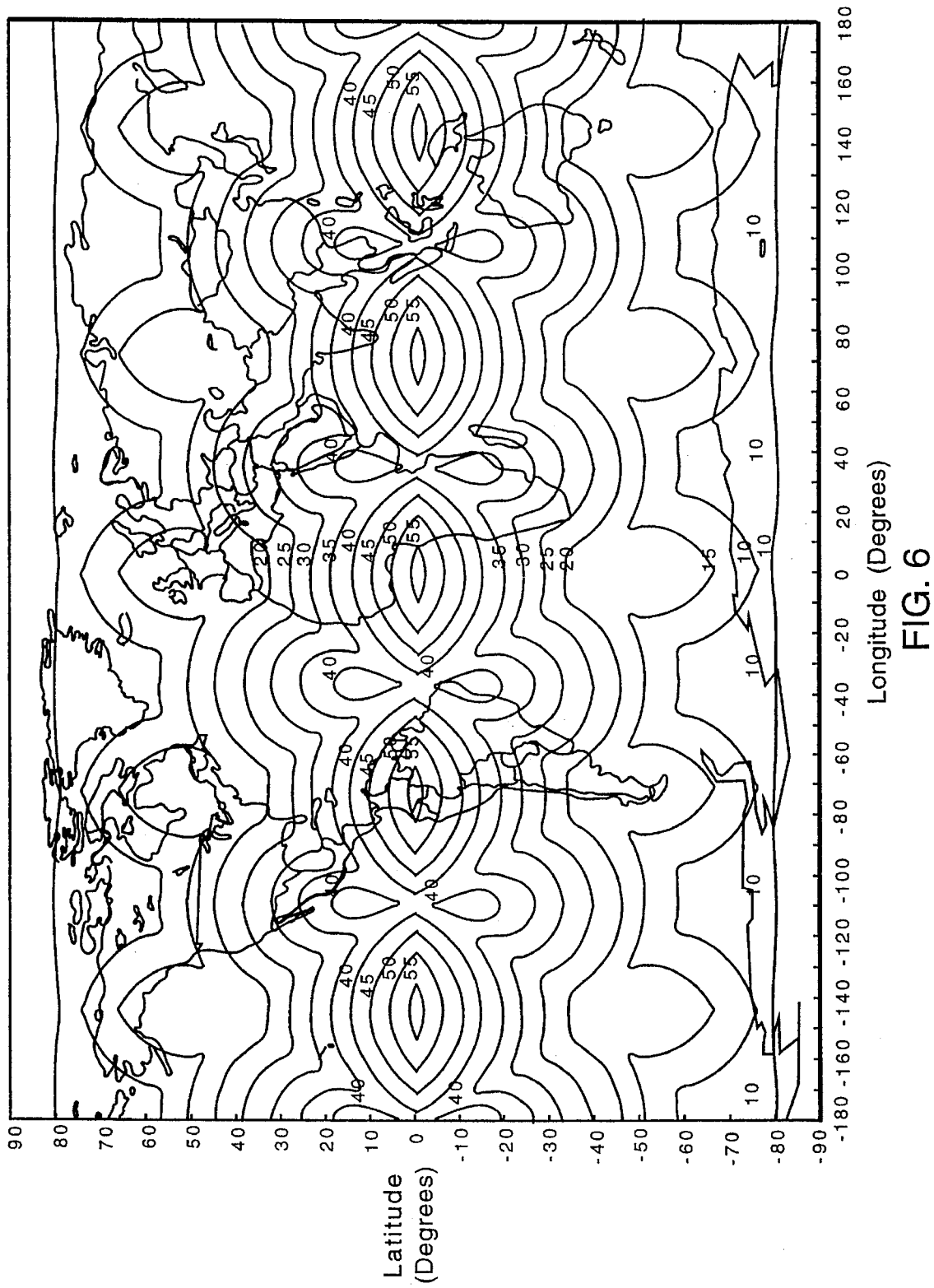
FIG. 6 and FIG. 7 illustrate the minimum satellite-to-ground elevation angles achievable via the 5 and 6 satellite constellations, respectively, with orbital parameters arranged to emphasize land mass coverage, FIG. 8 provides additional information for the 6 satellite constellation, by illustrating the extremely attractive satellite-to-ground elevation angles achievable at major city locations.
Figure 7:
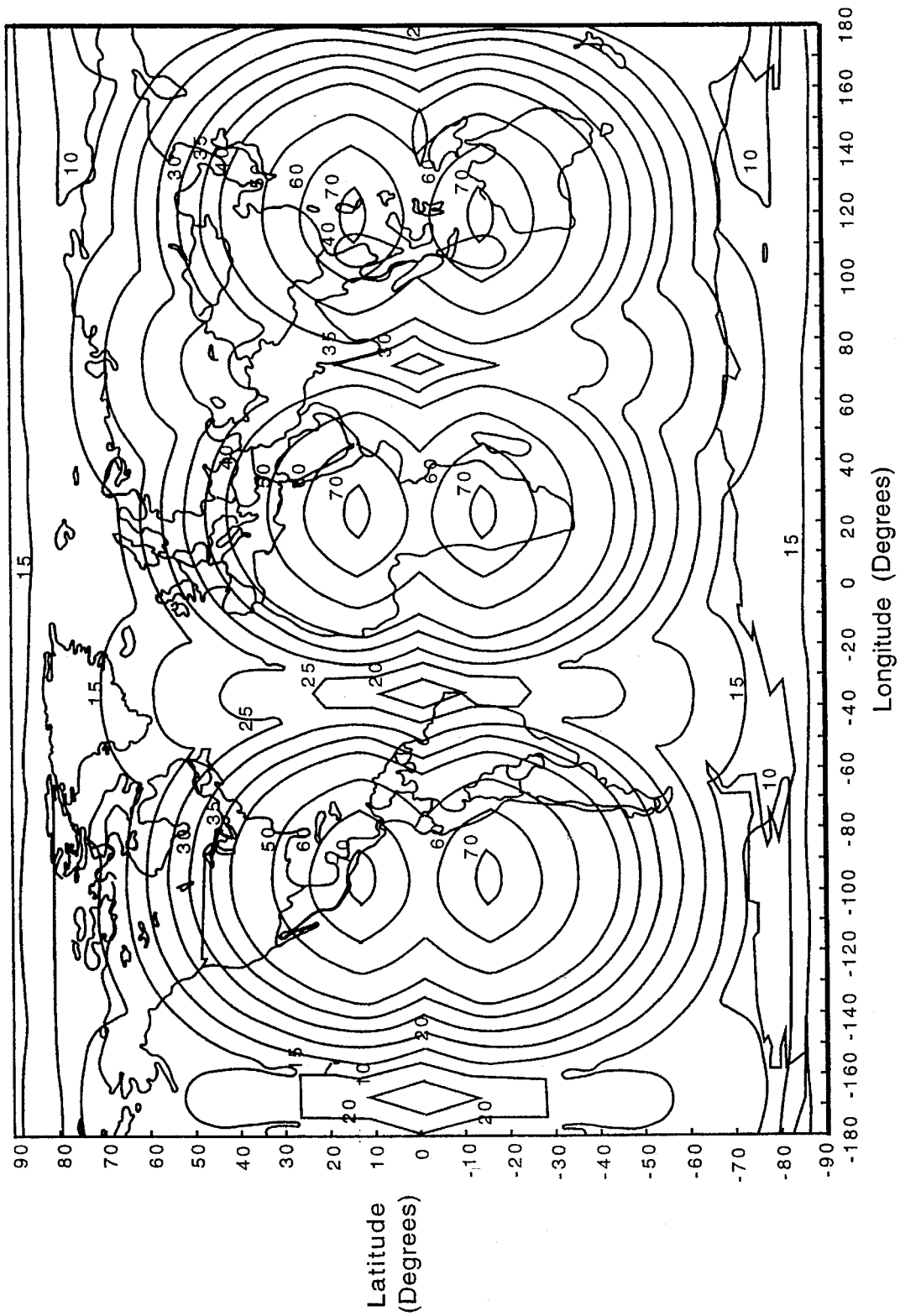
Figure 8:
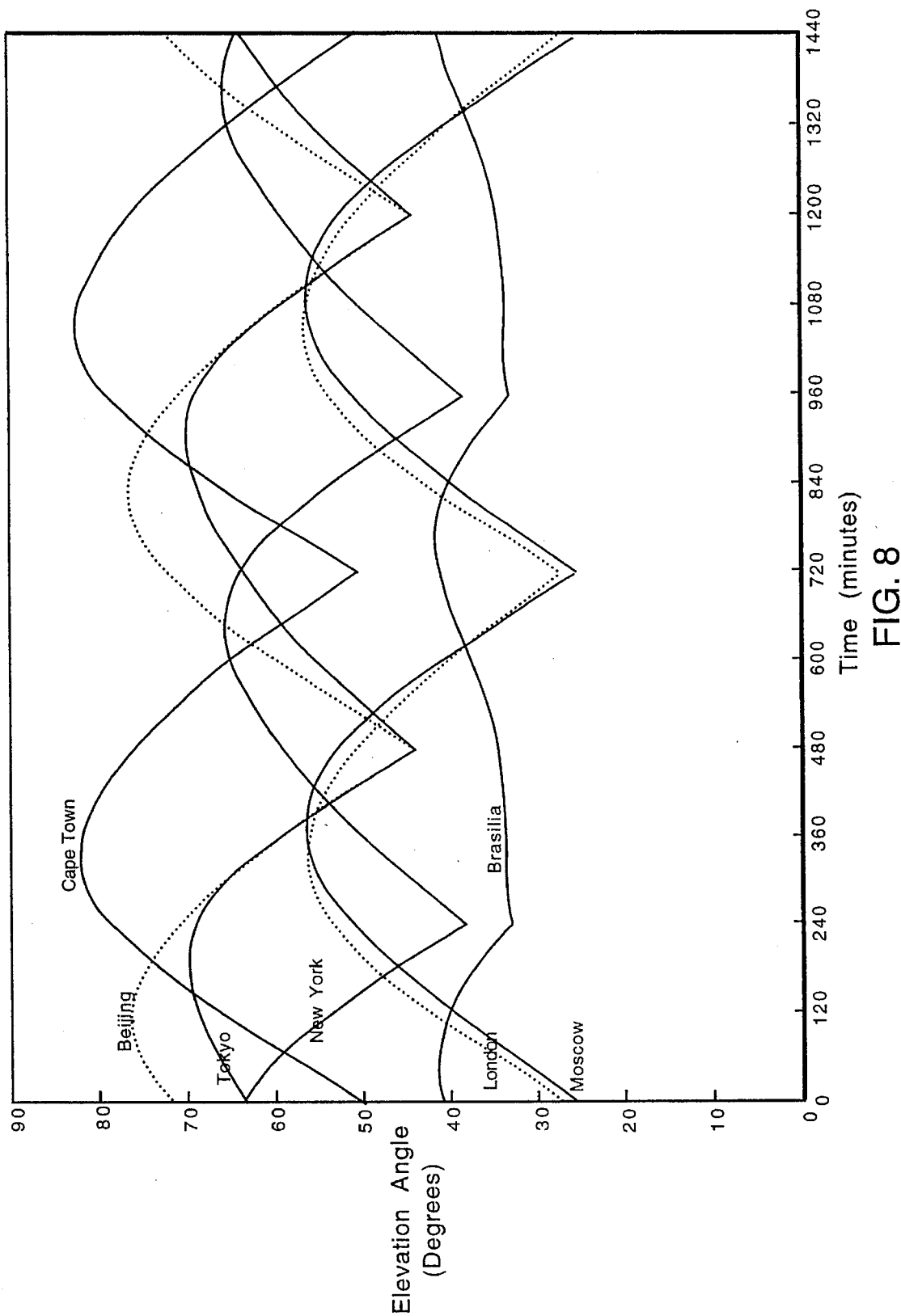

FIG. 4 and FIG. 5 begin with descriptions—i.e., motion and phasing—of representative GEO satellite constellations of interest, that address 5 and 6 satellites, respectively. Associated, minimum satellite-to-ground elevation angle performance is presented in FIG. 6 and FIG. 7. These constellations were selected to emphasize high elevation angles over land masses that encompass the highest population densities. As seen, both provide continuous global coverage with elevation angles >10°, even at the poles. Clearly, the 6 satellite constellation provides better performance and robustness, but at the expense of additional satellite cost. FIG. 8 further illustrates the variation of elevation angle vs. time for the 6 satellite constellation, for several illustrative, but significant, cities; as seen, the elevation angle excess 30° virtually 100% of the time for all the cities considered, and exceeds 40° in almost all cases.

For the remainder of this disclosure the 6 satellite constellation embodiment is selected, but the final constellation—including quantities, ascending nodes, and phasing—for implementation may vary. This, however, in no way diminishes the efficacy of this invention.

A summary of key features of the preferred constellation embodiment are:

1. Only 3 ground station gateways, spaced ~120°, are needed to support the entire 6 satellite constellation, with each gateway supporting 2 satellites. This is due to a combination of the satellite ascending nodes and the modest inclination angle of 28.5°.

2. Because of the GEO nature of the constellation, the global capability can evolve in stages, with each stage introducing and establishing another degree of regional coverage and/or robustness. For example, a launch schedule that sequentially inserts one satellite per ascending node evolves to fully operational, continuous, mid-latitude global coverage, one region at a time, via three launches; this series of launches also yields coverage at all latitudes ≧65% of the time. The subsequent three launches introduce robustness and dual coverage over the mid-latitudes, while finalizing continuous global coverage at the extreme latitudes. Note that this is in contrast to a LEO or MEO system that requires launch of virtually the entire constellation to provide 100% operational service in any region.

3. The GEO satellite virtually eliminates the need to hand over a user (stationary or mobile) from one satellite to another during a service support period.

4. As seen in FIG. 7, the satellite locations and phasing may be adjusted to accommodate diverse elevation angle requirements. For example, urban and other highly populated regions include obstructions (such as buildings) that must be accommodated by higher satellite-to-ground elevation angles (e.g, 30° or higher). On the other hand, sparsely populated regions and the oceans can accommodate elevation angles down to the 10°–20° range (e.g., to support science platforms and search and rescue).

5. This satcom system can be made to be interoperable with the established terrestrial cellular network. Specifically, the satcom two-way voice channels would be used only when terrestrial cellular is unavailable (e.g., during busy periods and in remote areas). As such, the number of two-way voice channels that must be accommodated can be dramatically reduced. Furthermore, the mobile two-way voice users would only experience the ~250 ms propagation delay when terrestrial cellular is unavailable. Finally, this satcom system can readily accommodate lower rate, lower cost message service, whenever voice channels are unavailable; this may be meaningful under scenarios such as sending a message (instead of a phone call) for auto-repair from a remote area. For sufficiently cost-effective service, this should be attractive to the typical consumer/mobile-user.

6. This satcom system coupled with the unique, on-board phased array (described below), can tailor the quantity, sizes and shapes of spot beams per satellite to the specific regions being covered, their needs, and capabilities. For example, the narrowest spot beams would be allocated to the highest-user-density/highest-data-rate areas (e.g., highly populated urban areas which support hand-held transceivers that operate up to 4.8 kbps). On the other hand, broader beams can be allocated to oceanic areas that support lower data rate users (e.g., search and rescue, or low rate science platforms) or higher rate users that have larger terminals at their disposal (e.g., ships).

7. Doppler on the user/satellite link is an insignificant acquisition/tracking concern, as compared to LEO or MEO mobile satcom systems.

8. Orbital motion of the satellite lends itself to highly accurate orbit determination. This accuracy may be increased further by using the motion of satellites used in this invention as an augmentation to GPS (e.g, have each satellite of this invention serve as a reference for differential GPS or DGPS).

9. User antenna beamwidth can potentially be narrowed—relative to LEO or MEO systems—due to the limited motion of each satellite of this invention.

Details of the satellite and ground system are described below in relation to FIGS. 9, 10 and 11.

SATELLITE AND GROUND SYSTEM DESCRIPTION

Preferring embodiments of the invention are implemented and operated in accordance with the following:

1. Long life—e.g., 15 years.
2. Low life cycle cost.
3. Low risk.
4. Communication link performance that, from a user perspective, is comparable to that of a LEO or MEO system.

These four key system features are inherent to the satellite architecture, its orbit, and its operational interface with the ground system.

SATELLITE ARCHITECTURE DESCRIPTION

Figure 9:
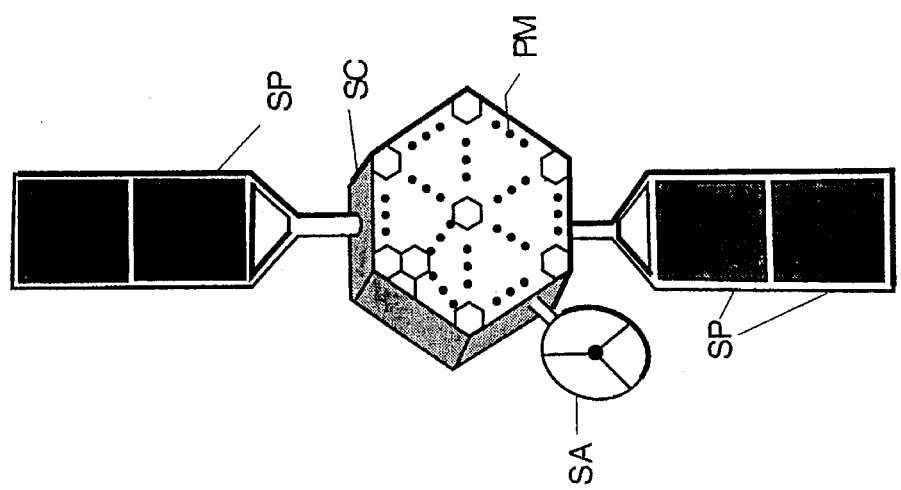
FIG. 9 is a pictorial illustration of the low-complexity satellite, which includes a large, stationary phased array, and a space/ground link antenna that is the only movable part of the communication payload.
Figure 10:
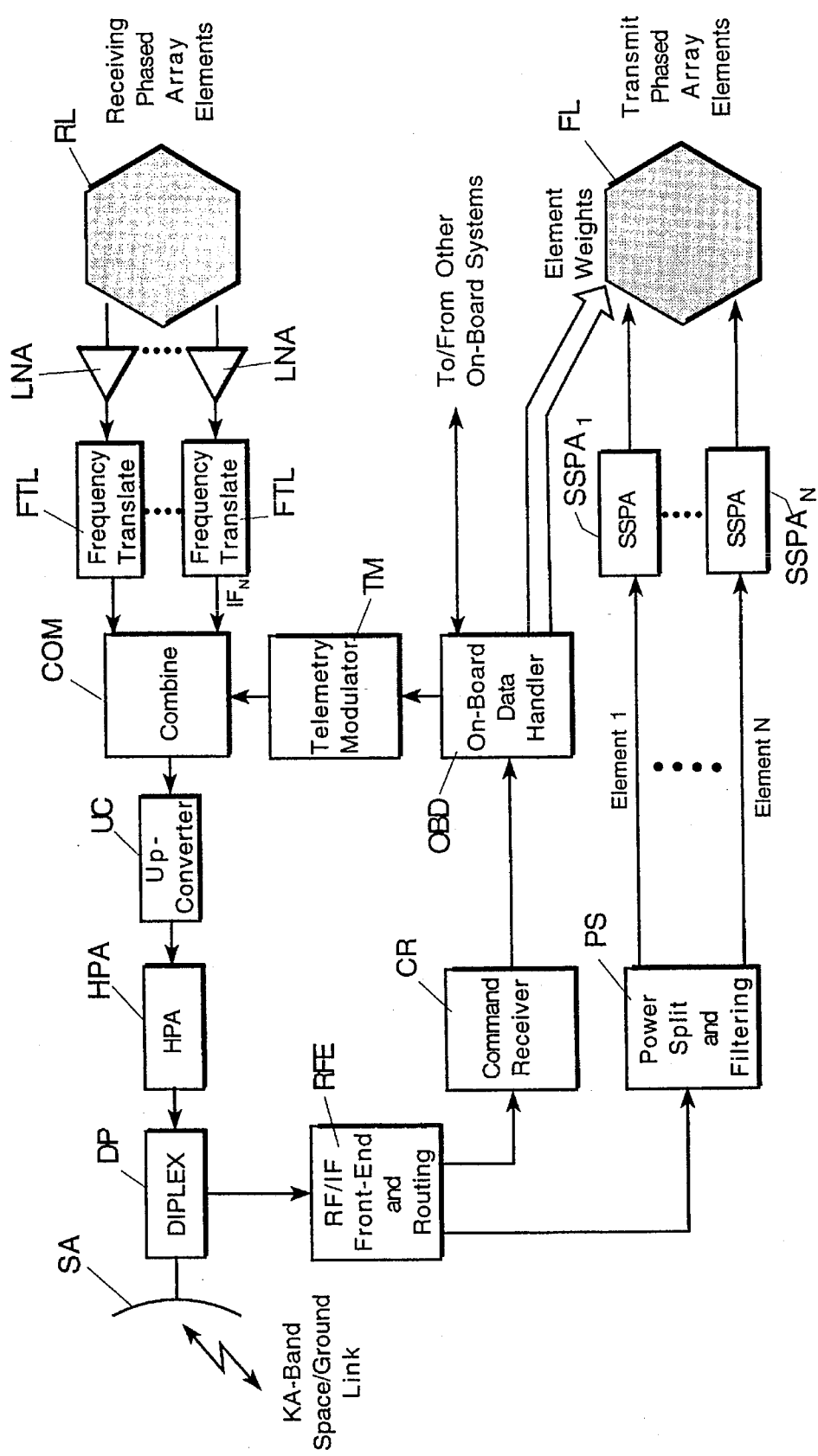
FIG. 10 illustrates a functional block diagram of the satellite communication payload incorporating the invention.
Figure 11:
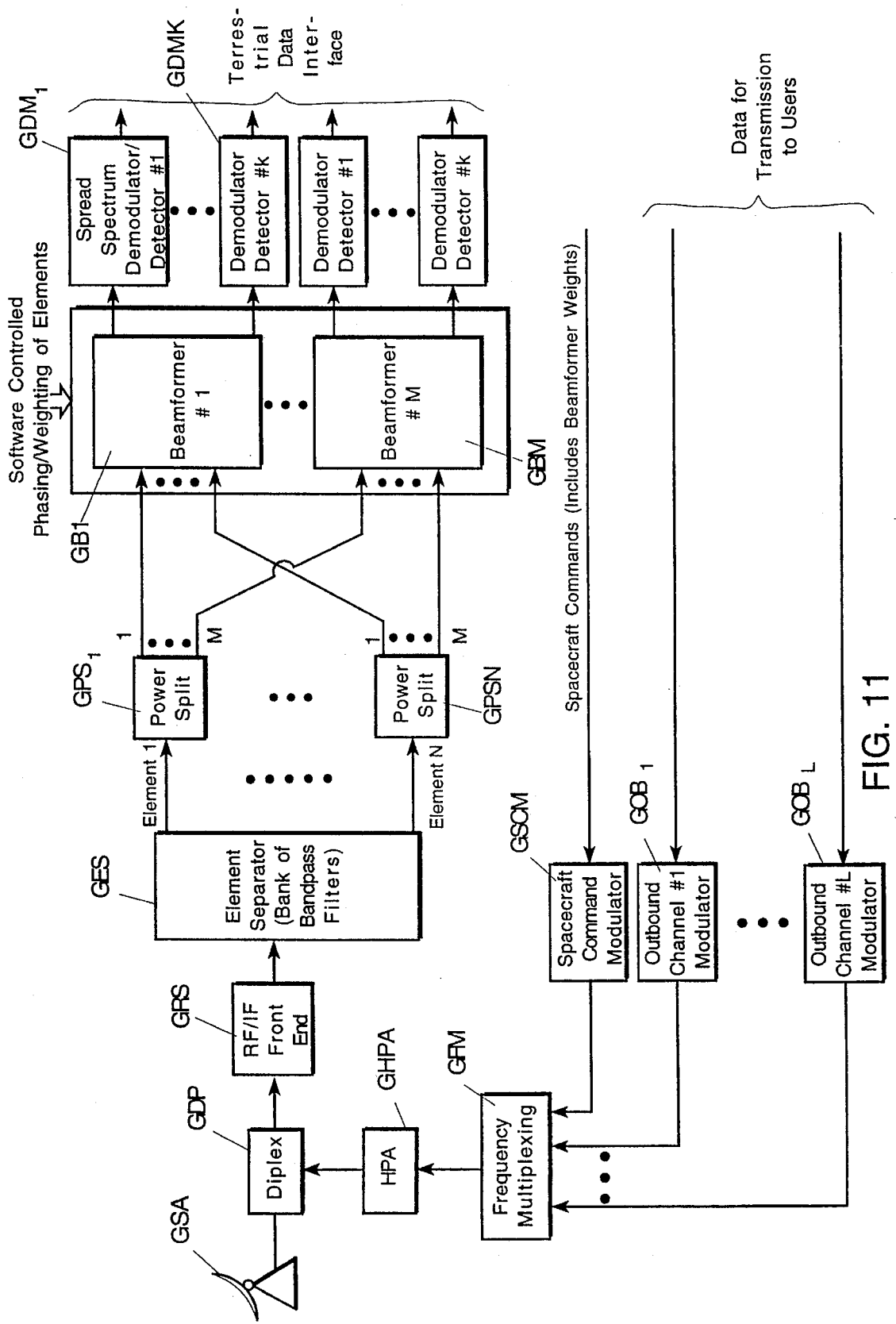
FIG. 11 illustrates a functional block diagram of each ground terminal incorporating the invention.

A diagrammatic external overview of the satellite is shown in FIG. 9, which is comprised primarily of a large, stationary phased array PA, and a steerable space/ground link antenna SA. The steerable space/ground link antenna SA is:

Gimballed 2 meter Ka-band space/ground link antenna
Transmit band
19–20 GHz
dual, linear polarization
Receive band, 29.5–30 GHz A functional description of the communication payload is shown in FIG. 10. The central unique feature of the satellite is its stationary, passive phased array RL and FL. This phased array concept is an extension of the array currently being successfully employed by the existing, on-orbit constellation of NASA's TDRS (see copending application Ser. No. 08/154,410, filed Nov. 19, 1993 entitled "SYSTEM FOR INCREASING THE UTILITY OF SATELLITE COMMUNICATION SYSTEMS"), it also reflects characteristics that have been proposed by multiple contractors for a future, TDRS follow-on. Electrical power is supplied by solar panels SP.

PHASED ARRAY CHARACTERISTICS

1. Dual layer of lightweight patch antenna elements PA. The array size is on the order of 4–5 meters in diameter (or aperture), encompassing 60–80 elements mounted on the body of the spacecraft SC.

2. Each element provides modestly greater than earth coverage ~20°, 2 dB beamwidth. Beamforming described below yields desired spot beams.

Transmit: 2.5 GHz±7.5 MHz

Receive: 1.6 GHz±7.5 MHz

3. Front layer FL of patch elements tuned to FCC allocated transmit band: 15 MHz bandwidth centered around ~2500 MHZ;

each element has its own SSPA ~2 watts;

electronic phasing of each element is performed on-board, via ground commands;

4. Front layer FL of patch elements is used to form one or more shaped beams that are tailored to the area of the world and the application; e.g., subset of elements (e.g., 10) allocated to broad beam, low rate application (e.g., acknowledgement, interrogation, paging);

most elements are allocated to spot beam(s) in high density land mass areas;

maximum effective isotropic radiated power (EIRP) ~55 dBW, if concentrated in one spot; can support 200–300 4.8 kbps channels with small user handset, or a larger number @ lower data rates;

minimum user EIRP ~20 dBW, via single element; can support ~300–500 bps with small handset, or 4.8 kbps voice with "briefcase" size antenna (e.g., in car or ship);

beams can be rapidly and dynamically allocated, based on need, without the need for any mechanical steering (and hence, no attitude control impact on the satellite);

beamwidth ranges from a minimum of 2° to a maximum of 20°.

5. Rear layer RL:

tuned to FCC allocated receive band: 15 MHz centered around ~1600 MHz;

Low noise amplifiers LNA directly attached to each element virtually eliminates passive loss and yields high G/T —10 dB/° K. at element beam edge→8–9 dB/° K. per formed beam;

LNA output of each element is frequency translated in frequency translator FTL to distinct 15 MHz band; each intermediate frequency is combined in frequency division multiplex combiner COM. Data and control from other on-board system OBD are sent by telemetry modulator TM to combiner COM, up-converted UC and supplied via high power amplifier HPA to diplexer DP and antenna SA. Signals received by antenna SA are supplied by diplexer DP to the RF front-end RFE, which route signals to the command receiver CR and on board data handler ODB, which supplies the element weights for the phased array front layer of elements FL. A power splitter PS directs signals to phased array antenna element 1 ... element N, which signals are amplifier SSPA and used to drive the respective element in the phased array.

1 GHz on one polarization supports up to ~64 elements; additional elements can be supported on the opposite polarization; alternatively, the two polarizations can be used to reduce the required downlink bandwidth;

beamforming and calibration are performed on the ground; yields beam sizes and shapes purely via ground processing, with the algorithms upgradable over time without impact to the satellite, the maximum number of non-overlapping beams that can be formed approximately equals the number of on-board elements.

6. Rear layer of patch elements is used to form an arbitrary number of receive beams on the ground.

the maximum number of non-overlapping beams that can be formed approximately equals the number of on-board elements (i.e., 60–80); this maximum yields full global coverage;

all required calibration is also performed on the ground;

ground beamforming yields beam sizes and shapes via electronic processing;

beamforming and calibration algorithms are upgradable over time, and may take advantage of sate-of-the-art advancements (e.g., for interference nulling, to accommodate partial element failures, or to enhance switching speed), without impact to the satellite; this clearly can enhance satellite utility and potentially increase its useful life, thereby maximizing return on investment;

beamwidth per formed beam is as low as ~2°; however, broader beamwidths can be employed in a manner analogous to that described above for the transmit, front layer of elements;

each ground-formed beam can simultaneously accommodate 50–100 random access user transmissions @4.8 kbps, with larger numbers at lower data rates; thus each satellite, with >60 formed can accommodate at least 3000–6000 simultaneous user transmissions.

7. This passive phased array permits all satellites to be interchangeable, with beam pointing accommodated purely by electronic phasing of the array. This significantly enhances constellation robustness and lifetime, and eases attitude control and momentum dumping.

8. Transmit and receive beam locations and shapes can be independently and dynamically controlled, tailored to the application.

ADDITIONAL SATELLITE FEATURES

1. Bent-pipe, frequency translation only.

2. 2 meter, Ka-band space/ground link (SGL) antenna SA only mechanically steerable portion of communication payload;

19–20 GHz, vertically/horizontally polarized for downlink; accommodates all signals for ground beamforming;

30 GHz±75 MHz, single polarization for uplink; accommodates up to several hundred to 1000 simultaneous outbound signals (depending on data rates).

3. Satellite d-c power requirement ~1.5–1 KW; dominated by outbound power transmission.

4. Launch vehicle: Delta potential

GEMS satellite is small compared to NASA's TDRS, which includes two additional large deployable antennas;

Delta feasible if phased array can be "folded-over" and deployed on orbit.

5. Long life—e.g., ≧15 years; due to combination of:

GEO orbit above Van Allen Belt;

patch elements have extremely low failure rate; even if failures occur, the degradation is very graceful (e.g, one element loss cause a fraction of a dB loss in link quality);

SGL antenna is the only movable part of the communication payload; also reduces impact on attitude control, momentum dumping, and fuel consumption.

GROUND SYSTEM

The ground system is comprised of gateways, preferably three for full earth covering, each of which incorporates the following features and functions, in support of at least two spacecraft:

1. Performs all spacecraft command and control; commands include uplink phasing of the phased array for directive satellite transmissions to desired user locations.

2. Tracks the moving satellites via combination of range and doppler tracking.

3. Steers the Ka-band space/ground antennas in accordance with satellite motion.

4. Performs all ground-beamforming associated with user inbound transmissions.

5. Performs all user signal modulation and demodulation.

6. Provides the necessary ground interfaces with the external cellular and terrestrial networks.

Figure 1:
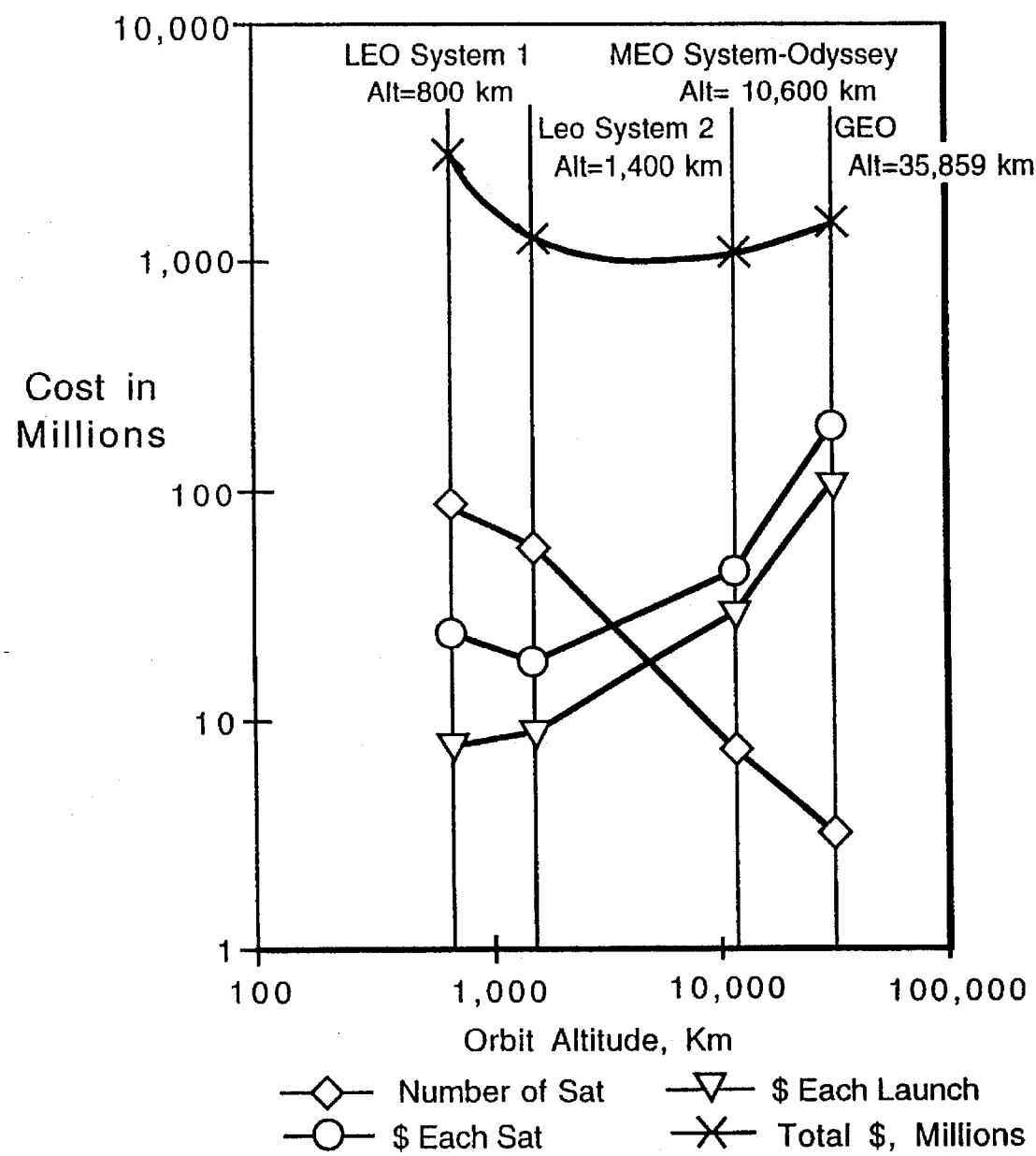
FIG. 1 is a graph illustrating cost trades, performed by TRW Corp., among systems that employ satellites in low, medium, and conventional geostationary orbits.

Items 4 and 5 represent the particularly unique features and functions of each gateway, and are expanded upon in FIG. 1. The following aspects are noteworthy:

1. The Ka-band RF input from antenna GSA via diplexer GDP is downconverted in the RF/IF front-end GRF to a convenient IF and then processed by an element separator GES, which consists of a bank of N filters that outputs the N phased array element signals that were separated out on-board the satellite. These N signals have embedded in them the composite of all user CDMA signals transmitted to the satellite.

2. Each element separator output is power divided by power splitter $GPS_1 \ldots GPS_N$ M times, where M is the total number of independent beams to be formed. Note that system user capacity is a direct function of M. The maximum number of independent non-overlapping beams that can be formed per satellite is approximately equal to the number of on-board elements—i.e., 60–80 for out case of interest. To be emphasized here is the fact that M, and hence system capacity, can be expanded even after the system has been operational for several years, via ground modifications only—i.e., without satellite impact.

3. The M sets of N power divided signals are then independently phased by beamformers $GB_1 \ldots GB_M$ to form M independent beams, with each beam having a G/T up to N times the G/T of an individual element. For example, the G/T of each earth coverage element will be on the order −10 dB/° K., thereby implying a G/T on the order of +8–+9 dB/° K. for each of the M formed beams. This high G/T is what is responsible for the high performance of this system. Signals from each ground beamformers $GB_1 \ldots GB_M$ are supplied to respective demodulators $GDM_1 \ldots GDM_K$ and thence to a terrestrial interface. Input data for transmission to users and spacecraft commands (including element weights for elements in front layer FL of the phased array) are provided to outbound modulator $GOB_1 \ldots GOB_L$ and spacecraft command modulator GSCM, whose outputs are frequency multiplexed GFM and supplied via high power amplifier GHPA and diplexer GDP to antenna GSA for transmission to a satellite.

4. Within the framework of an established, fixed number of beamformers per satellite, software controlled phasing/weighting of elements in the ground beamforming provides considerable flexibility and adaptability. First, while the minimum beamwidth of each beam is constrained by the overall array size, electronic beamforming on the ground can "defocus" the beam at any time to provide broader coverage with fewer beams, at the expense of decreased G/T. This may be meaningful for high latitude coverage, or certain oceanic applications, where users are more sparsely distributed and the operational environment permits use of a lower beamformed G/T (e.g., less obstructions for less multipath loss, or users with higher EIRP's). Another important consideration here is the adaptability of the electronic ground-beamforming to upgrades, based on need and/or technology. For example, situations may arise, wherein unanticipated interference is being introduced by non-system transmitters. In this case, nulling may be introduced into the ground beamforming process.

While preferred embodiments of the invention have been illustrated and described, it will be apparent that various adaptations and other embodiments will be readily apparent to those skilled in the art.

What is claimed is:

1. A satellite communication system for providing communication links between a plurality of earth-based low power transceivers and external cellular and terrestrial networks comprising:

one or more satellites in geosynchronous orbit and inclined at a predetermined angle greater than 0 relative to earth, each satellite having a multi-element phased array antenna and transmit and receive circuits selectively connected to said multi-element phased array antenna for providing spatially discriminated spot radiation beams on the earth's surface, and a steerable spaced-to-ground antenna and transmitter-receiver circuitry connected thereto, at least one gateway ground terminal having means for:

(1) performing uplink phasing of said phased array antenna for directive satellite transmissions to desired user locations, (2) tracking the moving satellites via combination of range and doppler tracking, (3) steering said space-to-ground antenna in accordance with satellite motion, (4) performing all ground-beamforming associated with user inbound transmissions, (5) performing all user signal modulation and demodulation, (6) providing the necessary ground interfaces with the external cellular and terrestrial networks, and a plurality of earth-based low power transceiver means for one and two-way communications via said selected elements of said phased array antenna.

2. The satellite communication system defined in claim 1 wherein said predetermined angle is about 28.5°.

3. The satellite communication system defined in claim 1 or 2 wherein there is a constellation of satellites and the number of satellites in said constellation is six or less.

4. A satellite communication system for providing communication links between a plurality of earth-based low power transceivers and external cellular and terrestrial networks comprising:

a constellation of satellites in geosynchronous orbit and inclined at a predetermined angle greater than 0° relative to earth, each satellite having a multi-element phased array antenna and transmit and receive circuits selectively connected to said multi-element phased array antenna for providing spatially discriminated spot radiation beams on the earth's surface, and a steerable space-to-ground antenna and transmitter-receiver circuitry connected thereto, at least one gateway ground terminal for:

(1) performing uplink phasing of said phased array antenna for directable satellite transmissions to desired user locations, (2) tracking the moving satellites via combination of range and doppler tracking, (3) steering said space-to-ground antenna in accordance with satellite motion, (4) performing all ground-beamforming associated with user inbound transmissions, (5) performing all user signal modulation and demodulation, (6) providing the necessary ground interfaces with the external cellular and terrestrial networks, and a plurality of earth-based low power transceiver means for one and two-way communications via said selected elements of said phased array antenna.

5. A satellite communication method for providing communication links between a plurality of earth-based low power transceivers and external cellular and terrestrial networks comprising, providing a constellation of geosynchronous satellites, inclined at about 28.5°, each satellite having multi-element phased array antennas for providing spot beams on the earth surface to provide spatial discrimination and high gain, at least one gimballed space-to-ground antenna means and receiver and transmitter circuitry therefor, providing at least three gateway ground terminals, each said gateway ground terminal:

(1) performing uplink phasing of the phased array for directive satellite transmissions to desired user locations, (2) tracking the moving satellites via combination of range and doppler tracking, (3) steering the gimballed space/ground antennas in accordance with satellite motion, (4) performing all ground-beamforming associated with user inbound transmissions, (5) performing all user signal modulation and demodulation, (6) providing the necessary ground interfaces with the external cellular and terrestrial networks, and a plurality of earth-based low-power transceiver means for connecting via the multi-element phased array antenna on said constellation of satellite.

6. A data collection system for collecting data from a large number of earth-based sites and directing collected data to a central earth site, comprising:

a satellite in geosynchronous orbit, said satellite is inclined at a predetermined angle greater than 0° relative to earth having: multi-element phased array antenna, transmit and receive circuits selectively connected to said multi-element phased array antennas to provide a large number of simultaneous, high quality spot beams, a steerable space-to-ground antenna means and transmitter/receiver circuit connected thereto for receiving collected data from said phased array antenna and transmitting collected data to said central earth site, a plurality of earth-based field user remote data source terminals, one data source terminal at each of said earth-based site, each said earth-based field user remote data source terminal having means for collecting said data and transmitting collected data to a selected element to said phase array antenna, and said central earth site including at least one gateway ground terminal for communicating with said satellite through said steerable space to ground antenna to receive said collected data from said satellite and transmit antenna control signals to said satellite to dynamically configure said phased array antenna for given areas of the earth.

7. The data collection system defined in claim 6 wherein said plurality of field user remote data source terminals are adapted to perform one or more of the following data collection services:

1) meter reading, 2) remote mobile tracking, 3) scientific data collection, 4) search and rescue, 5) aircraft traffic surveillance.

8. The data collection system defined in claim 6 wherein there is a constellation of said satellites in geosynchronous orbit and each satellite is inclined at a predetermined angle greater than 0° relative to earth.

9. The data collection system defined in claim 8 wherein said predetermined angle is about 28.5°.

10. The data collection system defined in claim 9 wherein the number of satellites in said constellation is six or less.

* * * * *